(12) United States Patent
Winston et al.

(10) Patent No.: US 10,921,027 B2
(45) Date of Patent: Feb. 16, 2021

(54) SOLAR THERMAL CONCENTRATOR AND METHOD OF FORMING SAME

(71) Applicant: The Regents of the University of California, Oakland, CA (US)

(72) Inventors: Roland Winston, Merced, CA (US); Lun Jiang, Merced, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 65 days.

(21) Appl. No.: 15/967,413

(22) Filed: Apr. 30, 2018

(65) Prior Publication Data

US 2018/0320931 A1   Nov. 8, 2018

Related U.S. Application Data

(63) Continuation of application No. 14/414,010, filed as application No. PCT/US2013/032524 on Mar. 15, 2013, now Pat. No. 9,958,185.
(Continued)

(51) Int. Cl.
*F24S 10/40* (2018.01)
*F24S 23/74* (2018.01)
(Continued)

(52) U.S. Cl.
CPC ............ *F24S 10/45* (2018.05); *B23P 15/26* (2013.01); *F24S 10/70* (2018.05); *F24S 10/75* (2018.05); *F24S 10/95* (2018.05); *F24S 23/74* (2018.05); *F24S 70/10* (2018.05); *F24S 20/20* (2018.05); *F24S 23/82* (2018.05); *F24S 80/50* (2018.05); *F24S 2010/751* (2018.05); *F24S 2023/834* (2018.05); *Y02E 10/40* (2013.01); *Y02E 10/44* (2013.01); *Y10T 29/49355* (2015.01)

(58) Field of Classification Search
CPC ......... Y02E 10/44; Y02E 10/41; Y02E 10/45; Y02E 10/40; F24J 2/055; F24J 2/12; F24J 2/07; F24J 2/14; F24J 2/10
See application file for complete search history.

(56) References Cited

U.S. PATENT DOCUMENTS

| 4,002,499 A | 1/1977 | Winston |
| 4,546,757 A * | 10/1985 | Jakahi ............... F24S 50/80 126/604 |

(Continued)

FOREIGN PATENT DOCUMENTS

| CN | 2679596 Y | 2/2005 |
| CN | 101430419 A | 5/2009 |

(Continued)

OTHER PUBLICATIONS

International Search Report (ISA/KR) for International Application No. PCT/US2013/032524, dated Jun. 26, 2013.
(Continued)

*Primary Examiner* — Jason Lau
(74) *Attorney, Agent, or Firm* — Foley & Lardner LLP

(57) ABSTRACT

A concentrator tube comprises a reflector portion having two walls; and an aperture closing an opening to the reflector portion. The aperture and the reflector portion extend longitudinally. The aperture is substantially flat relative to curvature of the reflector portion.

32 Claims, 20 Drawing Sheets

Related U.S. Application Data

(60) Provisional application No. 61/670,823, filed on Jul. 12, 2012.

(51) Int. Cl.

| | | |
|---|---|---|
| *F24S 10/70* | (2018.01) | |
| *F24S 10/75* | (2018.01) | |
| *F24S 70/10* | (2018.01) | |
| *F24S 10/95* | (2018.01) | |
| *B23P 15/26* | (2006.01) | |
| *F24S 20/20* | (2018.01) | |
| *F24S 23/70* | (2018.01) | |
| *F24S 80/50* | (2018.01) | |

(56) References Cited

U.S. PATENT DOCUMENTS

| | | |
|---|---|---|
| 5,255,666 A | 10/1993 | Curchod |
| 7,688,525 B2 | 3/2010 | Hines et al. |
| 2003/0047181 A1* | 3/2003 | Ghela ............... F24S 10/742 126/684 |
| 2007/0039611 A1* | 2/2007 | Benvenuti ............ F24S 23/80 126/652 |
| 2007/0188876 A1 | 8/2007 | Hines et al. |
| 2009/0000612 A1 | 1/2009 | Hines et al. |
| 2009/0188562 A1 | 7/2009 | Pavlak |
| 2010/0206296 A1 | 8/2010 | Matalon |
| 2011/0220092 A1 | 9/2011 | Ven |
| 2012/0073567 A1 | 3/2012 | Winston |

FOREIGN PATENT DOCUMENTS

| | | |
|---|---|---|
| JP | 2004-047753 A | 2/2004 |
| JP | 2009-524084 | 6/2009 |
| KR | 10-0420867 | 3/2004 |
| KR | 10-0696283 | 3/2007 |
| WO | WO-2012/040663 A2 | 3/2012 |

OTHER PUBLICATIONS

U.S. Final Office Action dated Nov. 13, 2017, from U.S. Appl. No. 14/414,010.

U.S. Non-final Office Action dated Jun. 22, 2017, from U.S. Appl. No. 14/414,010.

U.S. Notice of Allowance dated Feb. 16, 2018, from U.S. Appl. No. 14/414,010.

U.S. Office Action dated Mar. 13, 2017, from U.S. Appl. No. 14/414,010.

* cited by examiner

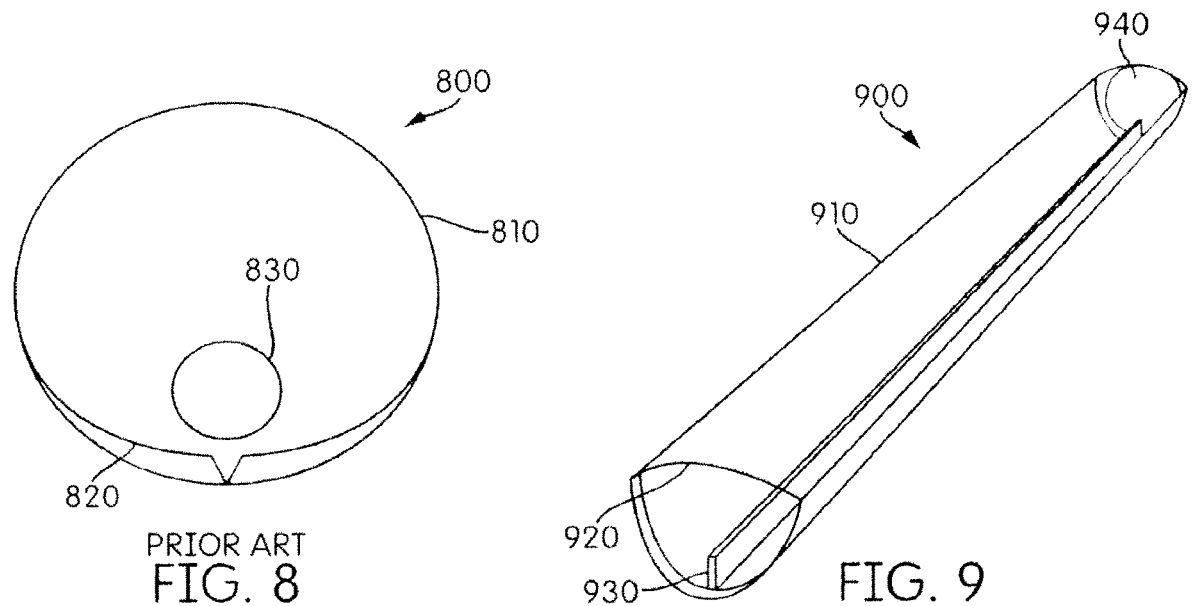
PRIOR ART
FIG. 8
FIG. 9
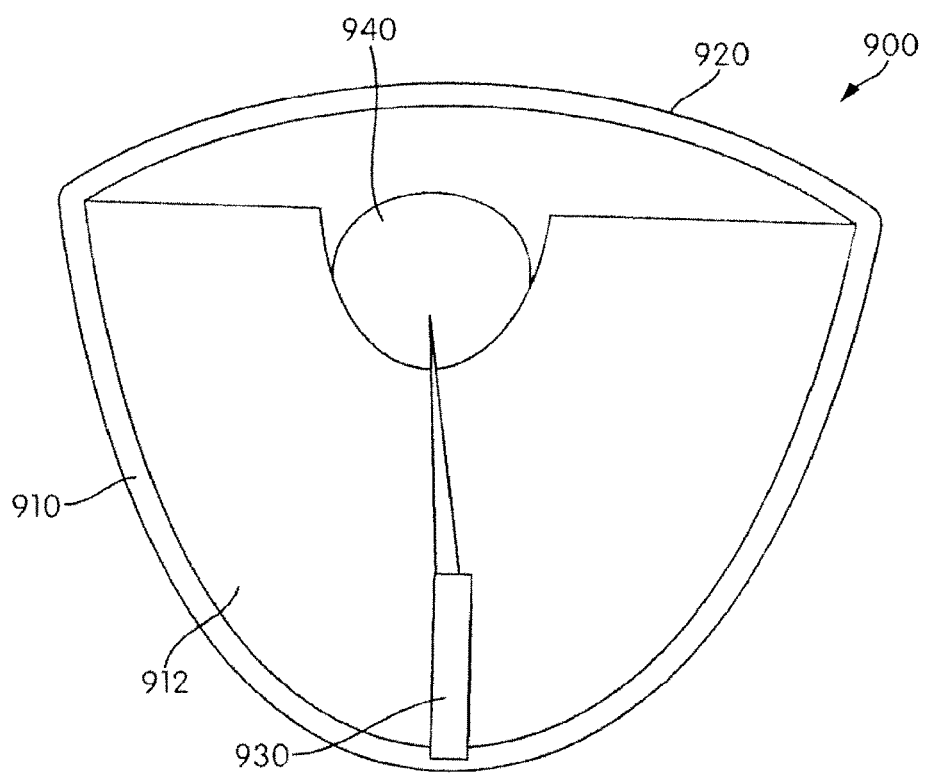
FIG. 10

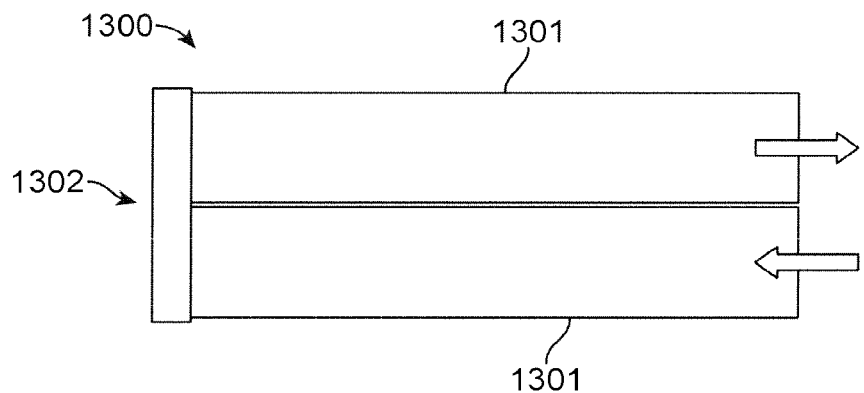
FIG. 13A
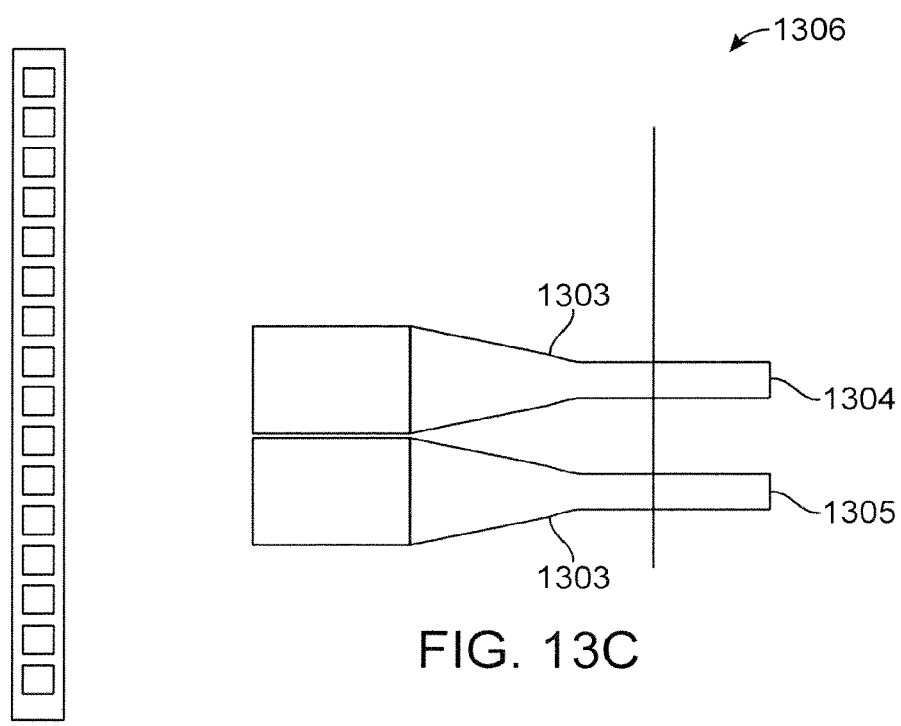
FIG. 13B
FIG. 13C

SOLAR THERMAL CONCENTRATOR AND METHOD OF FORMING SAME

CROSS REFERENCE TO RELATED APPLICATIONS

The present application is a continuation application of U.S. patent application Ser. No. 14/414,010, filed Jan. 9, 2015, which is a national stage entry under 35 U.S.C. § 371 of International Application No. PCT/US2013/032524, filed Mar. 15, 2013, which in turn claims the benefit of U.S. Provisional Patent Application No. 61/670,823, filed Jul. 12, 2012, entitled "SOLAR THERMAL CONCENTRATOR AND METHOD OF FORMING SAME," the entire contents of each of which are incorporated herein by reference.

TECHNICAL FIELD

The present disclosure relates to solar energy collectors and concentrators and, more specifically, to collectors and concentrators which are thermodynamically efficient without requiring tracking.

BACKGROUND

Many solar energy systems lack efficiency due to various factors. Additionally, many such systems require expensive tracking capability to track the sun across the sky. Without such tracking, these systems are incapable of collecting sufficient solar energy.

A number of systems for passive or non-tracking reflecting concentration of solar energy have been produced in the past. Among such systems are those shown in U.S. Pat. Nos. 5,537,991; 3,957,041; 4,002,499; 4,003,638; 4,230,095; 4,387,961; 4,359,265; 5,289,356; and 6,467,916 all of which are incorporated here by reference as if set forth fully. It is appropriate to refer to the reflectors as light-transmission devices because it is immaterial whether the reflectors are concentrating radiation from a large solid angle of incidence (e.g. concentrating solar light onto a solar cell) or broadcasting radiation from a relatively small source to a relatively large solid angle (e.g. collecting light from an LED chip to form a beam).

Concentration of radiation is possible only if the projected solid angle of the radiation is increased. This requirement is the direct consequence of the law of conservation of the etendue, which is the phase space of radiation. Solar concentrators which achieve high concentration must track the sun; that is, they must continuously reorient in order to compensate for the apparent movement of the sun in an earth center (Ptolemaic) coordinate system. Reflectors, in contrast, are fixed in position for most lighting purposes. For tracking collectors the direction to the center of the sun is stationary with respect to their aperture. Such concentrators can achieve very high concentrations of about 45000 in air. Even higher concentrations have been achieved inside transparent media.

Tracking, however, is technically demanding because solar collectors are commonly fairly large and designing these systems for orientational mobility may add significantly to their cost. Moreover the absorber, which incorporates some heat transfer fluid as well as piping, also may need to be mobile. This is the motivation to study the concentration which can be achieved with stationary, non-tracking devices. The same principles apply when it is desired to deliver light or other radiant energy from a small source to a relatively large solid angle.

SUMMARY

The inventors have realized that a concentrator assembly may be used, e.g., to collect solar energy to produce electrical energy. Embodiments of the concentrator assembly feature a wide acceptance angle, allowing for use in non-tracking applications.

Various aspects of examples of the disclosure are set out in the claims.

According to a first aspect, a concentrator tube is disclosed extending from a distal end to a proximal end including: a trough shaped reflector portion extending between the proximal end and the distal end and defining an upper opening, the reflector configured to concentrate light from a source onto an absorber; a light transmissive aperture member closing the upper opening of the trough shaped numbers; and an absorber located within the tube;

where the reflector portion is configured such that substantially any radiation energy emitted from the absorber onto the reflector is either directed to the source or directed back to the absorber.

In some embodiments, the tube encloses a volume. In some embodiments, the volume is substantially evacuated.

In some embodiments, the reflector portion is located on an interior wall of the volume.

In some embodiments, the reflector portion is located outside of the volume.

In some embodiments, the aperture member is less curved than the reflector portion.

In some embodiments, the aperture member is substantially flat.

In some embodiments, the absorber is positioned to accommodate refraction of light entering the concentrator tube through the aperture.

In some embodiments, the reflector portion is configured to accommodate refraction of light entering the concentrator tube through the aperture.

In some embodiments, the reflector portion is configured such that edge ray light rays refracted by the aperture reflect from the reflector portion and contact the absorber.

In some embodiments, the absorber is configured to have a thermal energy transfer fluid flowing therethrough.

In some embodiments, the absorber includes an input and a output for the thermal energy transfer fluid. In some embodiments, both the input and the output extend through a first end of the concentrator tube.

In some embodiments, the absorber has an end portion located proximal a second end of the concentrator tube. In some embodiments, the end portion is free to move within the tube in response to thermal expansion or contraction.

the absorber includes a plurality of minichannels configured to allow flow therethrough of the thermal energy transfer fluid.

In some embodiments, the tube concentrates light incident through the aperture member at angles to an optic axis less than an acceptance angle.

In some embodiments, the tube concentrates through the aperture member at angles to an optic axis less than an acceptance angle with an optical efficiency greater than 80%.

In some embodiments, the tube concentrates through the aperture member at angles to an optic axis less than an acceptance angle with an optical efficiency greater than 90%.

In some embodiments, the tube concentrates through the aperture member at angles to an optic axis less than an acceptance angle with an optical efficiency greater than 95%.

In some embodiments, the tube concentrates through the aperture member at angles to an optic axis less than an acceptance angle with an optical efficiency greater than 99%.

In some embodiments, the acceptance angle is greater than 10 degrees, 20 degrees, 25 degrees, 35 degrees, or more.

In some embodiments, the absorber includes a heat pipe.

In some embodiments, the absorber includes a u-shaped tube coupled to an absorber fin.

In another aspect, a method of forming a concentrator tube, including: forming a trough shaped reflector portion extending between the proximal end and the distal end and defining an upper opening, the reflector configured to concentrate light from a source onto an absorber; forming a light transmissive aperture member closing the upper opening of the trough shaped numbers; and positioning an absorber located within the tube. In some embodiments, the reflector portion is configured such that substantially any radiation energy emitted from the absorber onto the reflector is either directed to the source or directed back to the absorber.

In some embodiments, the reflector portion and the aperture are formed by rolling a mandrel on an outside surface of a softened glass tube.

Some embodiments include forming a seal at each end of the tube to form a substantial vacuum within the tube. In some embodiments, the seal at at least at one end is a metal-to-glass seal.

In another aspect, a method is disclosed including: receiving light from a source using a concentrator tube including: a trough shaped reflector portion extending between the proximal end and the distal end and defining an upper opening, the reflector configured to concentrate light from a source onto an absorber; a light transmissive aperture member closing the upper opening of the trough shaped numbers; and an absorber located within the tube. In some embodiments, the reflector portion is configured such that substantially any radiation energy emitted from the absorber onto the reflector is either directed to the source or directed back to the absorber.

Some embodiments include concentrating light from the source onto the absorber; and converting energy from the light into a thermal energy in the absorber. In some embodiments, the source is the sun.

Various embodiments may include any suitable combination of the above described elements.

BRIEF DESCRIPTION OF THE DRAWINGS

For a more complete understanding of example embodiments of the present disclosure, reference is now made to the following descriptions taken in connection with the accompanying drawings in which:

FIG. 8 is a schematic illustration of a prior art internal concentrator;

FIG. 9 is a perspective view of an internal concentrator according to an embodiment of the present disclosure;

FIG. 10 is a frontal view of the internal concentrator of FIG. 9;

FIGS. 13A-13C illustrates a u-tube absorber featuring minichanels.

DETAILED DESCRIPTION

Various configurations of solar collectors and concentrators have been used with varying degrees of efficiency. Thermodynamically efficient concentrators can provide a higher level of concentration of thermal radiation captured by the concentrators. For example, an external compound parabolic concentrator is described in U.S. Patent Publication No. 2012/0073567, which is hereby incorporated by reference in its entirety.

Figure 1:
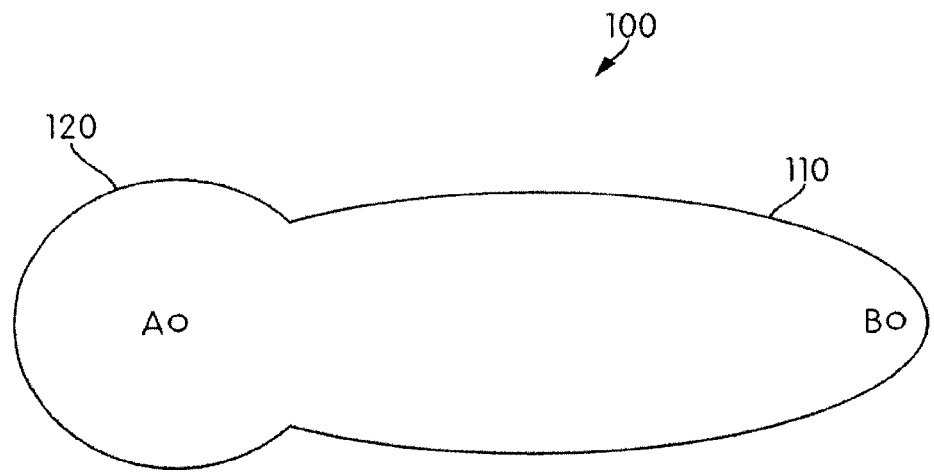
FIG. 1 is a schematic illustration of a theoretical ellipsoidal/spherical enclosure.

Conventional solar collectors have been designed based solely or primarily on the principles of imaging optics. However, it can be illustrated that the use of imaging optics fails in real-world applications. In this regard, reference is made to FIG. 1, which illustrates an ellipsoidal/spherical enclosure 100. One portion of an ellipsoid 110 is replaced with a portion of a sphere 120. Points A and B represent the foci of the ellipsoid 110, while point B also represents the center of the sphere 120. If point masses are positioned at each of points A and B, then $F_{AB}$ is the probability of radiation from the mass at point A reaching the mass at point B, and $F_{BA}$ is the probability of radiation from the mass at point B reaching the mass at point A. Using the principles of imaging optics, it is apparent from the ellipsoidal body 100 that $F_{AB}$ is much less than $F_{BA}$. Thus, the point mass at A would continually heat up, while the point mass at B would continually cool down. Of course, this violates the second law of thermodynamics.

Figure 2:
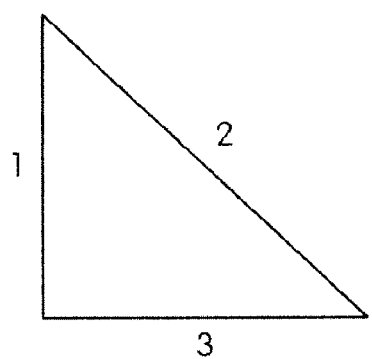
FIGS. 2 and 3 illustrate enclosures to demonstrate the use of strings.
Figure 3:
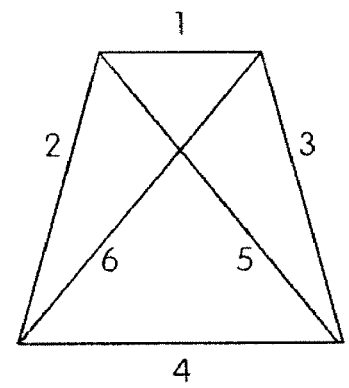

Embodiments of the present disclosure forego imaging optics and, instead, rely upon the principles of thermodynamics. Reference is now made to FIGS. 2 and 3, along with the theory of furnaces. Referring first to FIG. 2, a three-wall enclosure is illustrated having walls 1, 2 and 3. $F_{ij}$ is the probability of radiation from wall i reaching wall j. Thus, from the enclosure of FIG. 2, we can obtain six unknowns ($F_{12}$, $F_{13}$, $F_{21}$, $F_{23}$, $F_{31}$ and $F_{32}$) and six equations:

$$F_{12}+F_{13}=1$$

$$F_{21}+F_{23}=1$$

$$F_{31}+F_{32}=1$$

$$A_1 F_{12}=A_2 F_{21}$$

$$A_1 F_{13}=A_3 F_{31}$$

$$A_2 F_{23}=A_3 F_{32},$$

where Ai is the surface area of wall i. These equations can now be solved to obtain:

$$F_{12}=(A_1+A_2-A_3)/(2A_1)$$

$$F_{13}=(A_1+A_3-A_2)/(2A_1)$$

$$F_{23}=(A_2+A_3-A_1)/(2A_2).$$

Referring now to FIG. 3, a four-wall enclosure is illustrated with walls 1, 2, 3 and 4. Using strings representing imaginary walls 5 and 6, the four-wall enclosure can be divided into two three-wall enclosures. Using the same process as described in FIG. 3 for the two threewall enclosures and combining the results provides:

$$F_{14}=[(A_5+A_6)-(A_2+A_3)]/(2A_1)$$

$$F_{23}=[(A_5+A_6)-(A_1+A_4)]/(2A_2).$$

Figure 4:
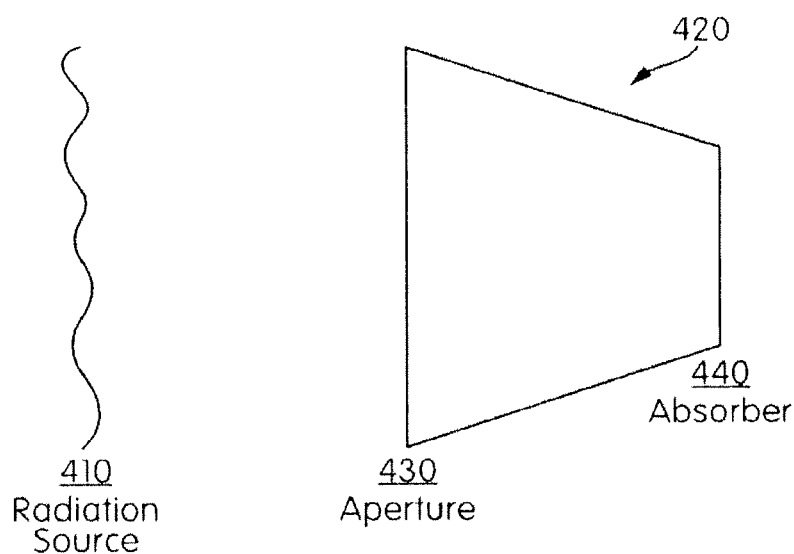
FIG. 4 is a schematic illustration of a general solar concentrator.

As illustrated in FIGS. 4-7, the string method can be used to design an optimal solar concentrator. Referring first to FIG. 4, a general concentrator is schematically illustrated.

FIG. 4 illustrates a radiation source 410, such as the sun, and a concentrator 420. The concentrator 420 has an aperture 430 and an absorber 440. The design of the concentrator can vary and may depend on a variety of factors, such as cost of materials, ease of manufacturing, etc. In designing the theoretically optimal concentrator, the temperature at the absorber 440 is maximized, while maintaining the temperature of the radiation source 410, which is considered as a heat reservoir. This requires that radiation energy from the absorber 440 only reaches the radiation source 410 or the absorber 440.

Figure 5:
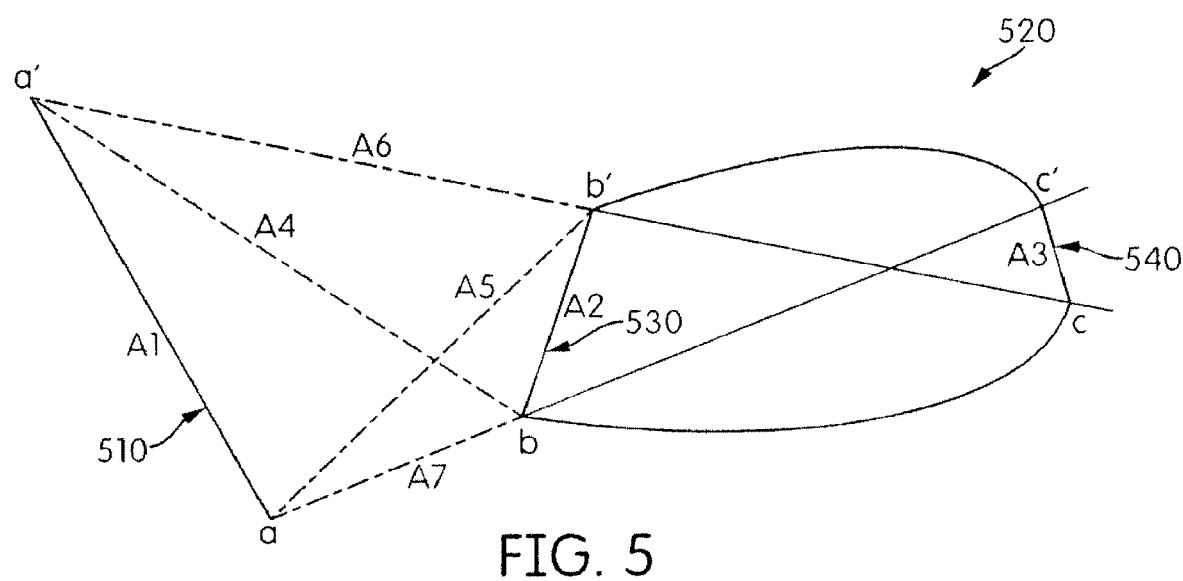
FIG. 5 illustrates the use of strings in design of a solar concentrator.
Figure 6:
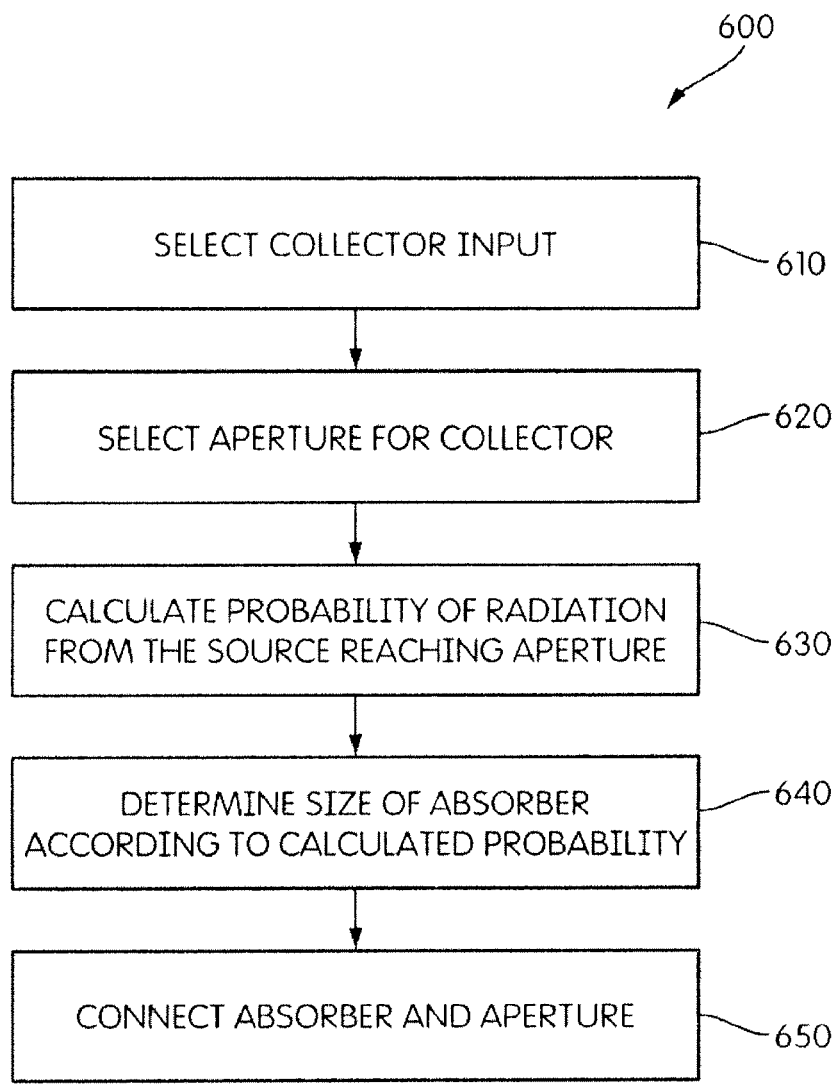
FIG. 6 is a flow chart illustrating a method of forming a concentrator according to an embodiment of the present disclosure.

Accordingly, a thermodynamically efficient concentrator may be designed with these concepts. In this regard, the above-described concentration problem may be used in reverse to arrive at a thermodynamically efficient concentrator. Referring now to FIGS. 5 and 6, one particular example of a design is illustrated. FIG. 5 illustrates a source 510 and a concentrator 520, which includes an aperture 530 and an absorber 540. FIG. 6 is a flow chart describing a design method in accordance with one embodiment. At block 610, the design begins with selecting an input for the collector, or the source 510, which in most cases is a given (i.e., the sun). Next, at block 620, the aperture 530 is selected. In this regard, while the aperture 530 in FIG. 5 is illustrated as a straight line (or flat surface), the aperture 530 is not restricted to any particular shape. However, as noted above, in an efficient concentrator, the probability of radiation energy from the absorber 540 reaching the source 510 should be 1, or 1 minus the probability of radiation from the absorber 540 returning to the absorber 540.

Next, at block 630, the probability of radiation from the source 510 reaching the aperture 530 is calculated. In this regard, strings are drawn from the ends of the source (a, a') to the end of the aperture (b, b'). Assume the surface areas are $A_1$ for the source 510, $A_2$ for the aperture 530, $A_3$ for the absorber 540, $A_4$ for the surface formed by a'b, $A_5$ for the surface formed by ab', $A_6$ for the surface formed by a'b', and $A_7$ for the surface formed by ab. Using the results shown above with reference to FIG. 3, the probability of radiation energy from the source 510 reaching the aperture 530 can be calculated as: $F_{12}=[(A_4+A_5)-(A_6+A_7)]/(2A_1)$.

From this equation, the size of the absorber is calculated (block 640). In this regard, we can solve for $A_3$, which equals $A_2 F_{21}$: $A_2 F_{21}=\frac{1}{2}[(A_4+A_5)-(A_6+A_7)]$, so that $$A_3=\frac{1}{2}[(ab'+a'b)-(ab+a'b')].$$

In one embodiment, $A_3$ is approximately 0.46 $A_2$ or approximately 0.21 $A_1$. Of course, those skilled in the art will appreciate that these are example values for one embodiment and in no way constitute any limitation.

Next, the surface of the absorber 540 may be drawn using the size calculated. The absorber 540 is drawn by extending the lines a'b' and ab, and drawing the absorber between the extended lines. It is noted that, while the absorber 540 is illustrated in FIG. 5 as a flat surface, in various embodiments, the absorber 540 may have another shape, such as a convex shape.

Further, the absorber 540 may be oriented in various configurations. As illustrated in FIG. 5, the absorber 540 need not be parallel to any other surface.

Figure 7:
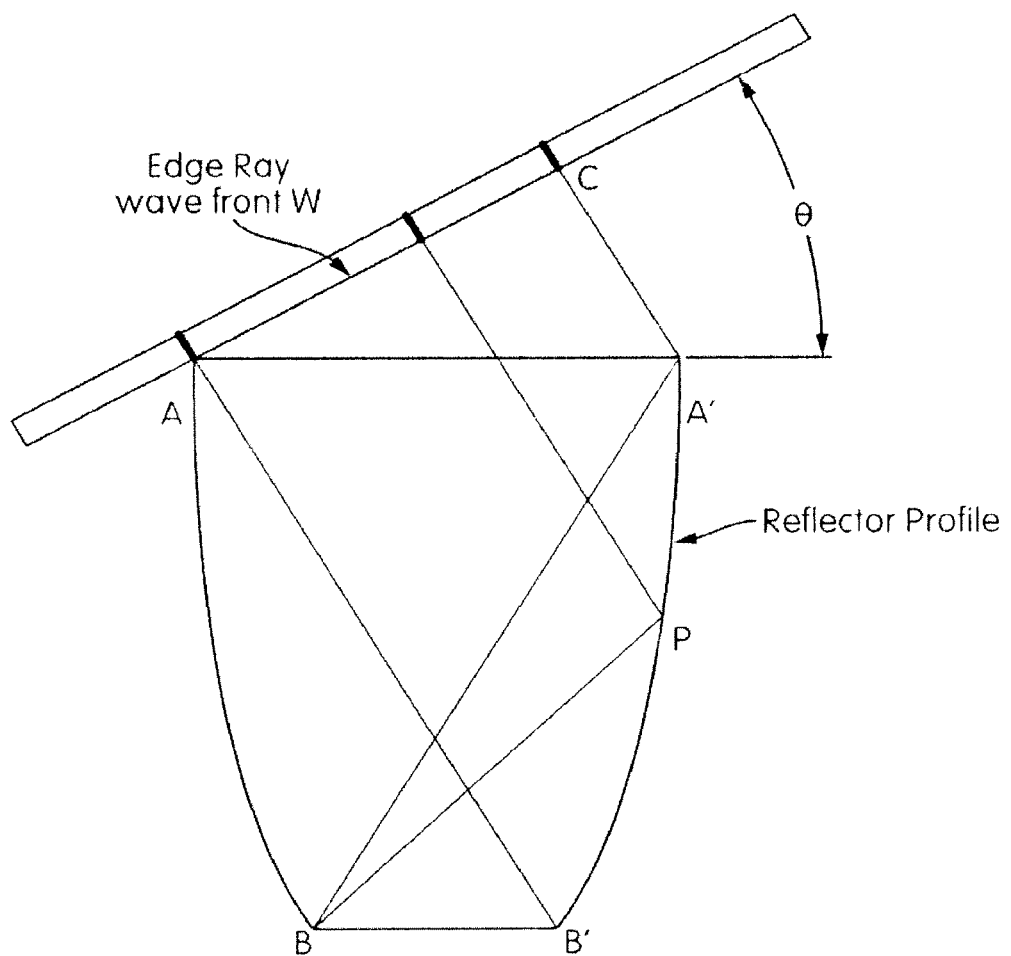
FIG. 7 illustrates the use of strings in design of the walls of a solar concentrator.
Figure 11A:
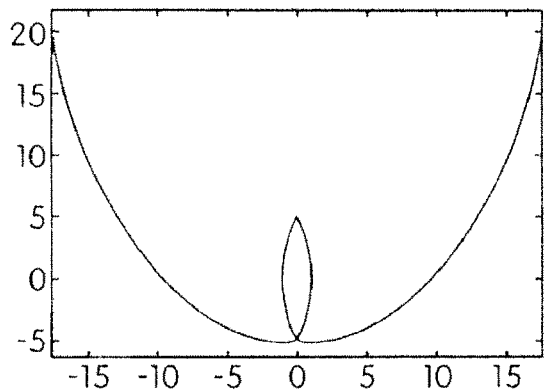
FIGS. 11A-F illustrate various configurations of a concentrator and absorber for use with a collector in accordance with embodiments of the present disclosure.
Figure 11B:
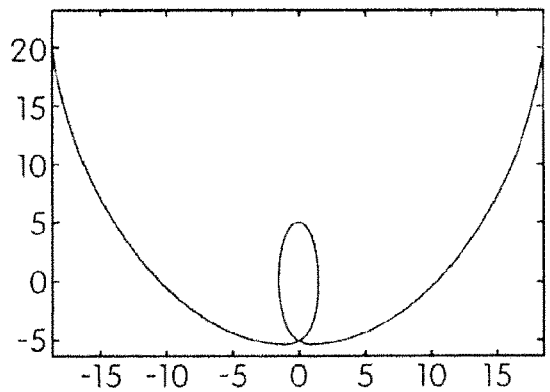
Figure 11C:
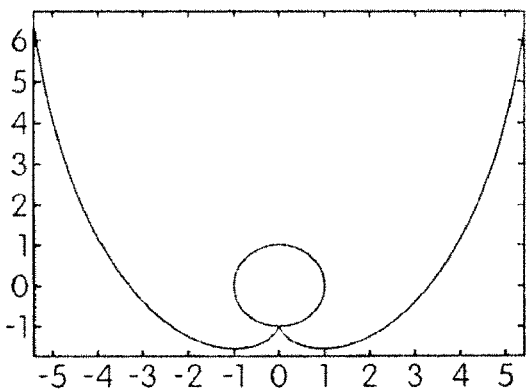
Figure 11D:
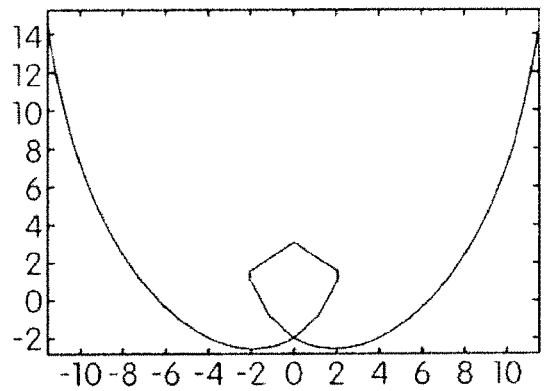
Figure 11E:
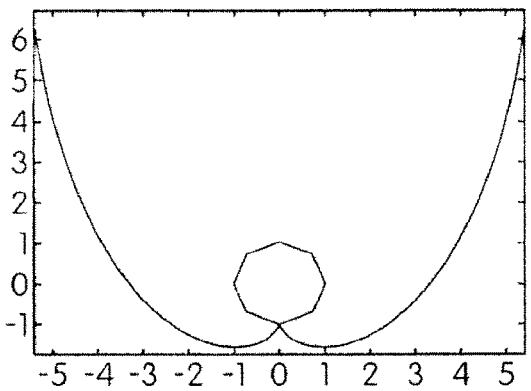
Figure 11F:
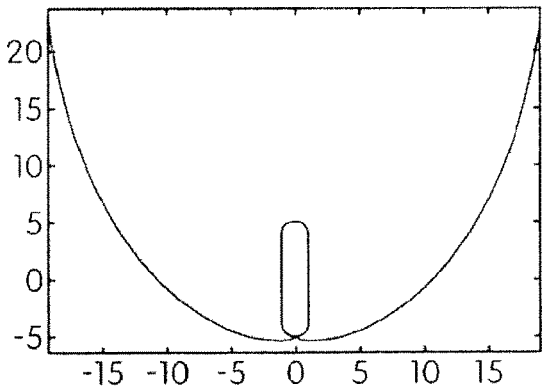

Finally, the design of the concentrator 520 may be completed by connecting the absorber to the aperture (block 650) by drawing the side walls be and b'c'. Referring now to FIG. 7, a method of drawing the side walls in accordance with one embodiment is illustrated.

An edge ray wave front is positioned at the aperture at a predetermined acceptance angle Θ. The wave front is provided with one ring that slides in a manner similar to a shower curtain. One end of a string is connected to the sliding ring at one end of the wave front near point C in FIG. 7 and the other end to B'. The string is then stretched from C to A, then to B, The string is pulled tight perpendicular to wavefront W at point C. As the ring at point C is slid along the wave front W towards A', the string is maintained taut, thereby tracing the wall AB.

The resulting concentrator exhibits greater efficiency due to a design based on nonimaging optics and thermodynamics. While an optimum concentrator would require that all radiation incident on the aperture also reach the absorber, such a design may be impractical or prohibitively expensive. For example, such a design may result in the hot absorber contacting optical surfaces. In this regard, one embodiment allows some radiation incident on the aperture to miss the absorber to result in an efficient and practical design.

In addition to using non-imaging thermodynamic concentration, further efficiency increase is achieved by embodiments of the present disclosure by forming the concentrator as an internal collector. Internal concentrators take advantage of the benefits of a vacuum insulation.

FIG. 8 is a schematic illustration of a prior art internal concentrator 800. The concentrator 800 is formed in a glass tube 810 having a circular cross section. A reflector 820 is formed inside the glass tube 810. An absorber 830 is positioned above the reflector 820. Thus, thermal energy enters the glass tube 810 and is concentrated by the reflector 820 onto the absorber 830.

In the prior art internal concentrator 800, the top of the glass tube 810 forms an aperture having a circular profile. The circular profile of the aperture has several drawbacks. For example, the curvature of the aperture results in refraction of the incoming thermal energy rays. The refraction results in energy losses through, for example, a reduction in the effective acceptance angle of the concentrator. Further, the curvature of the aperture results in the requirement for additional material when compared to a flatter aperture.

Referring now to FIGS. 9 and 10, an internal concentrator in accordance with an embodiment of the present disclosure is illustrated. FIG. 9 illustrates a perspective view of an internal concentrator 900, while FIG. 10 illustrates a frontal view of the internal concentrator 900. The internal concentrator tube 900 includes a reflector portion 910 extending longitudinally and having walls that may be formed in accordance with the string method described above. In one embodiment, the reflector portion forms a thermodynamically efficient concentrator with a reflective surface 912 on the inside of the reflector portion 910. In various embodiments, the thermodynamically efficient concentrator may have various configurations, such as a compound parabolic concentrator. In one embodiment, the reflective surface 912 is formed by coating the inside of the reflector portion 910 with a reflective material.

The internal concentrator tube 900 further includes an aperture 920 closing the opening of the reflector portion 910. In one embodiment, the aperture 920 and the reflector portion 910 are integrally formed, thus eliminating the need for a seal between the two components. In accordance with embodiments of the present disclosure, the aperture 920 is substantially flat when compared to the reflector portion 910. In this regard, as used herein, substantially flat includes, but is not limited to, a flat surface or an arc with a radius that is substantially larger than half the size of the opening of the reflector portion 910. In various embodiments, the arc has a radius that is between 2 and 20 times half the size of the opening.

In one embodiment, the junction of the reflector portion 910 and the aperture 920 forms a substantially right angle. In various embodiments, the angle formed by the reflector portion 910 and the aperture 920 is between about 60 degrees and about 120 degrees, preferably between about 70 degrees and about 110 degrees, more preferably between about 80 degrees and about 100 degrees, and still more preferably between about 85 degrees and about 95 degrees. The internal concentrator tube 900 of FIG. 9 illustrates a sharp corner formed at the intersection of the reflector portion 910 and the aperture 920. In some embodiments, the intersection of the reflector portion 910 and the aperture 920 may be rounded due to, for example, limitations of glass tube-forming techniques.

Thus, the aperture 920 is substantially flat when compared to the reflector portion 910 and when compared to prior art internal concentrators. The flatter configuration minimized or eliminates reduction in the effective acceptance angle due to refraction of the incoming rays of thermal energy. Further, the flatter configuration reduces the amount of material needed to form the glass tube.

The internal concentrator tube 900 further includes an absorber 930 extending the length of the tube 900. The tube is positioned to receive thermal energy reflected from the reflective surface 912. A fluid flowing through the absorber 930 is heated by the thermal energy. The flowing fluid serves to transfer thermal energy to, for example, a manifold connecting a plurality of internal concentrator tubes. Various configurations of the absorber 930 are illustrated and described below with reference to FIGS. 11A-F.

As illustrated on one end of the internal concentrator tube 900 in FIG. 9, a glass-to metal seal 940 is formed. Of course, both ends of the tube 900 should be sealed to allow for a vacuum to be formed within the tube 900. In one embodiment, the internal concentrator tube 900 maintains a vacuum therein with a glass-to-metal seal 940 at one end of the tube and an integrally formed glass cap (not shown) at the other end. In this regard, as a part of the tube forming process, one end of the tube may be formed as a closed end. The absorber 930 may be a U-shaped tube which transmits heat transfer fluid into and out of the internal concentrator tube 900 through the end with the glass-to-metal seal. In another embodiment, both ends of the tube are sealed with a glass-to-metal seal. The vacuum eliminates or reduces efficiency losses due to conduction or convection. In various embodiments, a vacuum pressure of $1.0 \times 10^{-2} N/m^2$ is maintained.

The glass tube 900 may be formed in any of a number of ways, including methods that are well known to those skilled in the art. For example, reference may be made to U.S. Pat. No. 7,475,567, which describes a method for forming a continuous glass tube with a shaping body on the inside of the tube. In one embodiment, the glass tube is formed by pressing a mandrel or mold on the outside of the softened glass tube to shape the tube.

Referring now to FIGS. 11A-F, a variety of configurations of the reflector portion and the absorber are illustrated. The absorber is formed and positioned based on the precise configuration of the reflector portion and the desired acceptance angle. Additionally, the absorber should be configured to allow a thermal energy fluid to flow therethrough without significant friction losses, while at the same time achieving efficient transfer of thermal energy from the reflector to the fluid. In this regard, the absorber may include a heat absorbing fin.

Further, as illustrated in FIGS. 11A-F, the reflector portion may be formed such that a gap exists between the absorber and the bottom of the reflector portion. This can be designed in accordance with thermodynamically efficient design methods.

In accordance with various embodiments, an internal concentrator is formed of a glass tube. The reflector is formed by placing a reflective coating on a part of the internal surface of the glass tube. The reflective coating may be formed by, for example, sputtering silver or aluminum onto the glass tube or by chemical deposition of silver onto the glass tube.

In various embodiments, the thickness of the glass forming the aperture 920 may cause aberrations (e.g., refraction) in the light entering the internal concentrator 900. In this regard, the internal concentrator 900 may be configured to account and correct for such aberrations. In this regard, one example configuration is described below with reference to FIG. 12.

Figure 12:
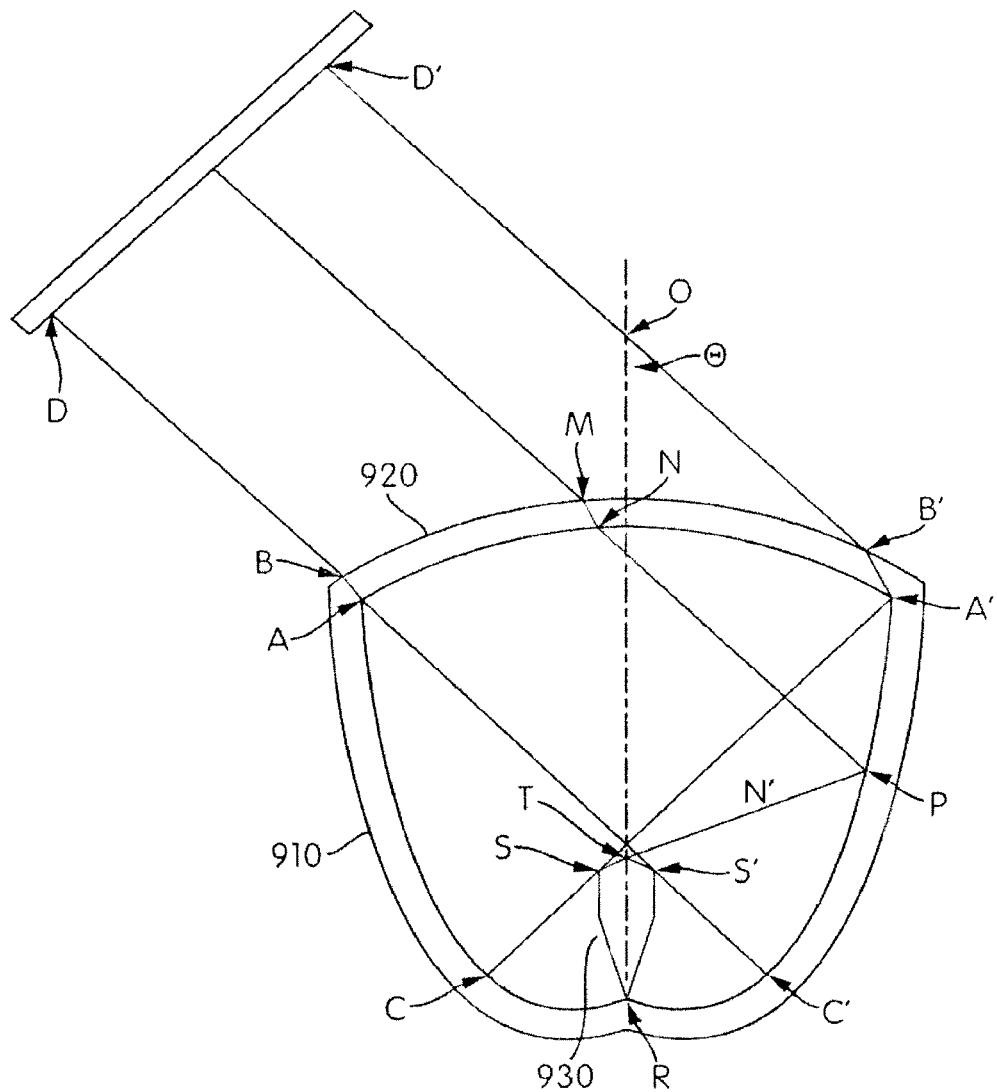
FIG. 12 illustrates aberration correction in accordance with an embodiment of the present disclosure.

FIG. 9 illustrates an internal concentrator 900 with a reflector portion 910 and an aperture 920. A similar internal concentrator is illustrated in FIG. 12 with the additional illustration of certain light rays. An example absorber 930 is illustrated in FIGS. 9 and 12, but as noted above, various shapes of absorbers are contemplated within the scope of the present disclosure. Referring now to FIG. 12, light from a source 901 is directed into the internal concentrator 900 through the aperture 920. In the illustration of FIG. 9, the light from the source 901 enters the internal concentrator 900 at an incident angle Θ (ROB'). The aperture 920 is assumed symmetrical (ABB'A') and has an arbitrary refractive index.

Based on the circumference of the absorber 930, the internal length AA' of the aperture 920 is calculated. This length AA' is calculated as the circumference of the absorber 930 (RSTS'R) divided by the sine of the incident angle Θ: AA'=(RSTS'R)/sin(Θ).

The slope of the reflector at A' is chosen to reflect ray A'C to be mirror symmetric to AC'. Thus, AC' and A'C intersect at the centerline OR. The position of the absorber 930 relative to the aperture 920 is based on the rays entering the internal concentrator 900 on the edges of the aperture 920, AC' and A'C. The angle or position of symmetric rays AC' and A'C can be calculated since the rays DB and D'B' are parallel, having the incident angle Θ and known refractive index of the aperture glass. Thus, assuming the absorber 930 is symmetric, the absorber 930 contacts, but does not cross, the rays AC' and A'C and is below the intersection of the rays A'C and AC'. Thus, the absorber 930 can be positioned relative to the aperture 920 according to the refracted rays A'C and AC'.

Now, the shape of the reflector portion 910 may be calculated for a configuration to account for aberrations caused by the aperture 920. Starting from position A' where the reflector slope has been determined, the curve continues with each successive slope reflecting the edge rays from DD' into rays tangent to the absorber in the usual way. In this way, the method of nonimaging edge ray design can be employed even in the presence of refraction by the glass of the aperture 920. This process can be repeated for all points between A' and C'. The portion of the reflector from C' to R is designed to reflect tangent rays from the absorber 930 back on themselves. Thus, the shape of the reflector portion 910 can be calculated based on the refracted rays passing through the glass forming the aperture 920.

Various embodiments may employ absorbers with various form factors. As noted above, in some embodiments, the absorber may have an inlet and an outlet that allow thermal energy transfer fluid to flow through the absorber.

In some embodiments, the absorber may be formed as a u-shaped tube or "u-tube", where the fluid inlets and outlets are positioned at the same end of the absorber, with a u-shaped flow path connecting the inlet/outlet.

For example, FIGS. 13A-13C illustrates a u-tube absorber 1300. Each leg 1301 of the u-shaped tube contains a plurality of channels that serve to increase the contact area between the fluid in the channels and the absorber. An end connector 1302 transfers fluid from the channels of one leg to the other. On the opposite end from the end connector 1302, a transformers 1303 collect flow to and from the channels to provide a single inlet 1304 and outlet 1305 for the absorber 1300. In some embodiments, the inlet 1304 and outlet 1305 may extend though an endcap member. The joint between the inlet 1304 and outlet 1305 may be sealed, e.g., using a weld.

Figure 14:
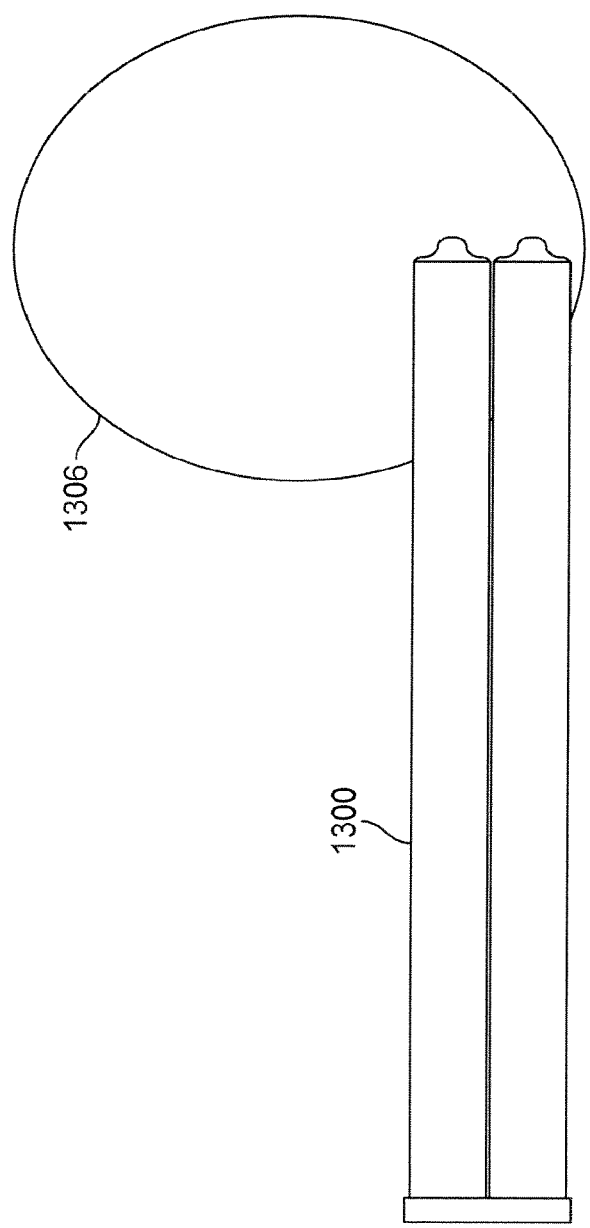
FIG. 14 illustrates the u-tube absorber of FIG. 15 mounted to concentrator tube end cap.
Figure 15:
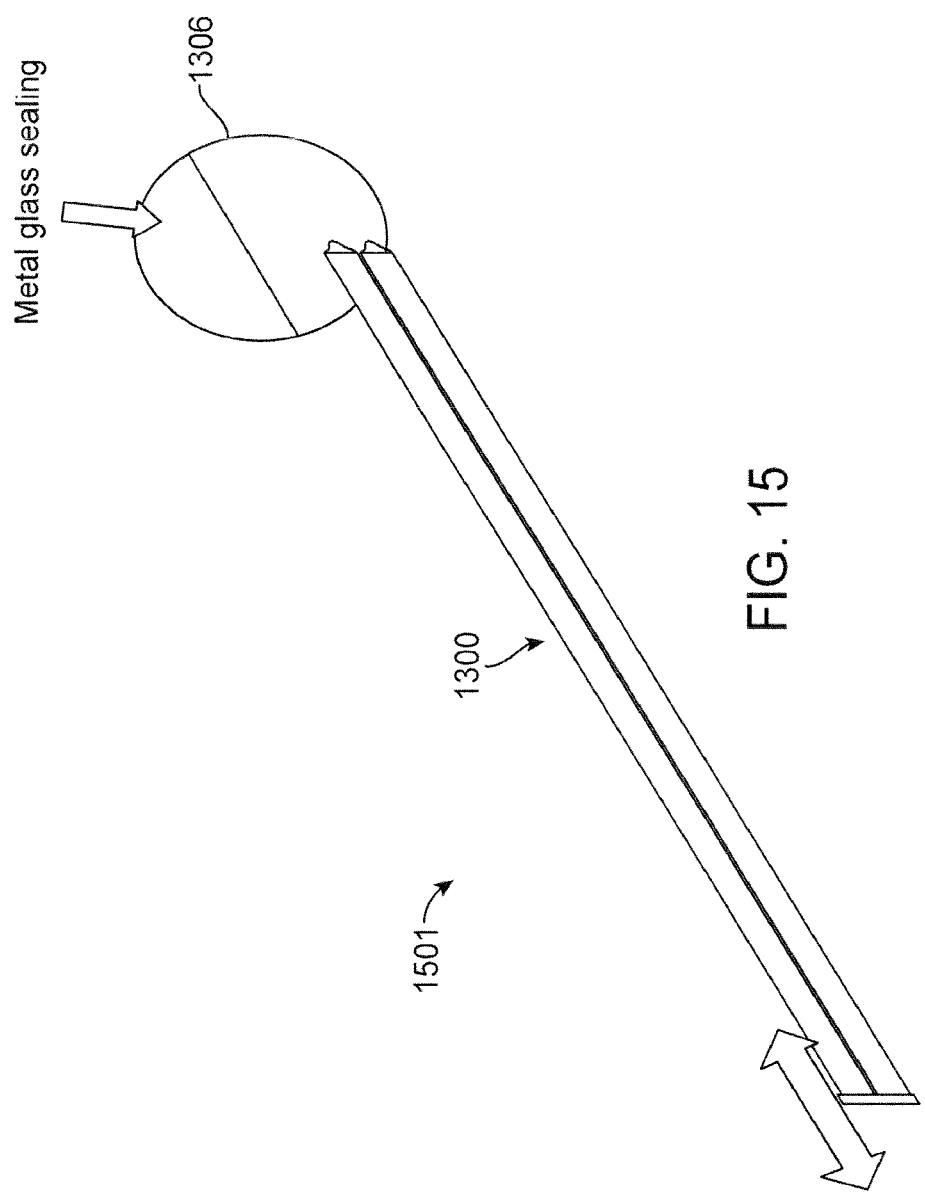
FIG. 15 illustrates the u-tube absorber of FIG. 15 mounted in a concentrator tube. As shown, the reflective portion of the tube has been removed for clarity.

FIG. 14 shows a full view of the u-tube absorber 1300 attached to the end cap 1306. FIG. 15 shows the -tube absorber 1300 positioned within a concentrator tube 1501 of the type described herein. The endcap 1306 may be, e.g. a metal member (e.g., made from Kovar).

In some embodiments the channels may be minichannels, having a cross sectional area of less than 1 cm^2, 1 mm^2, 0.1 mm^2, or less.

FIG. 15 illustrates the u-tube absorber 1300 of FIG. 13 mounted to concentrator tube end cap. The endcap 1306 is sealed to the tube, e.g., using a metal to glass seal. Note that the opposite end of the absorber 1300 is free to move within the tube, e.g., in response to thermal expansion and contraction.

Figure 16:
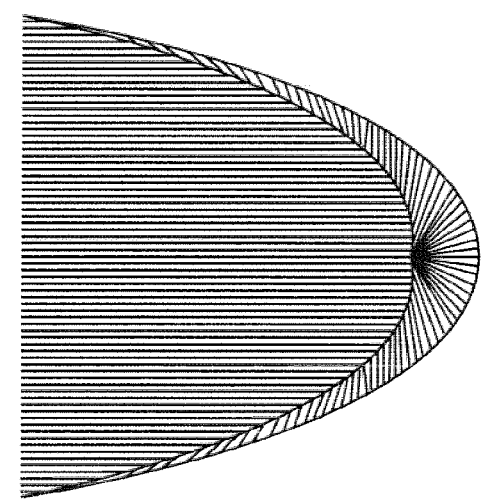
FIG. 16 illustrates ray traces for the concentrator tube assembly shown in FIG. 15.
Figure 16:
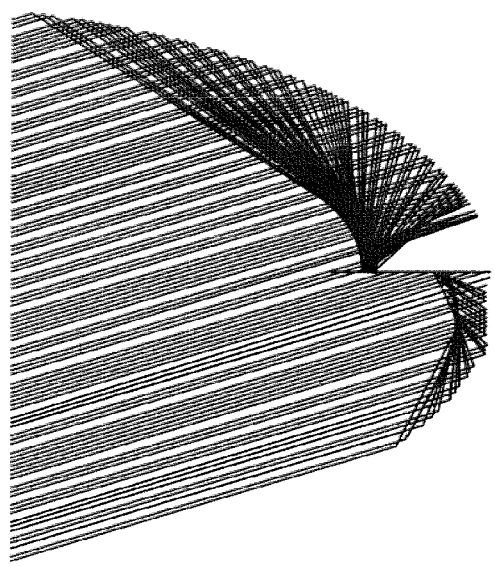
Figure 16:
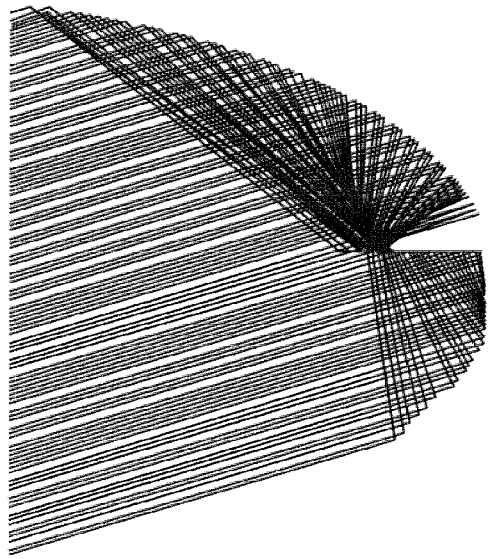

FIG. 16 illustrates ray traces for a thermodynamically efficient concentrator tube assembly shown in FIG. 15. Each pane shows light rays incident at a different angle.

Figure 17:
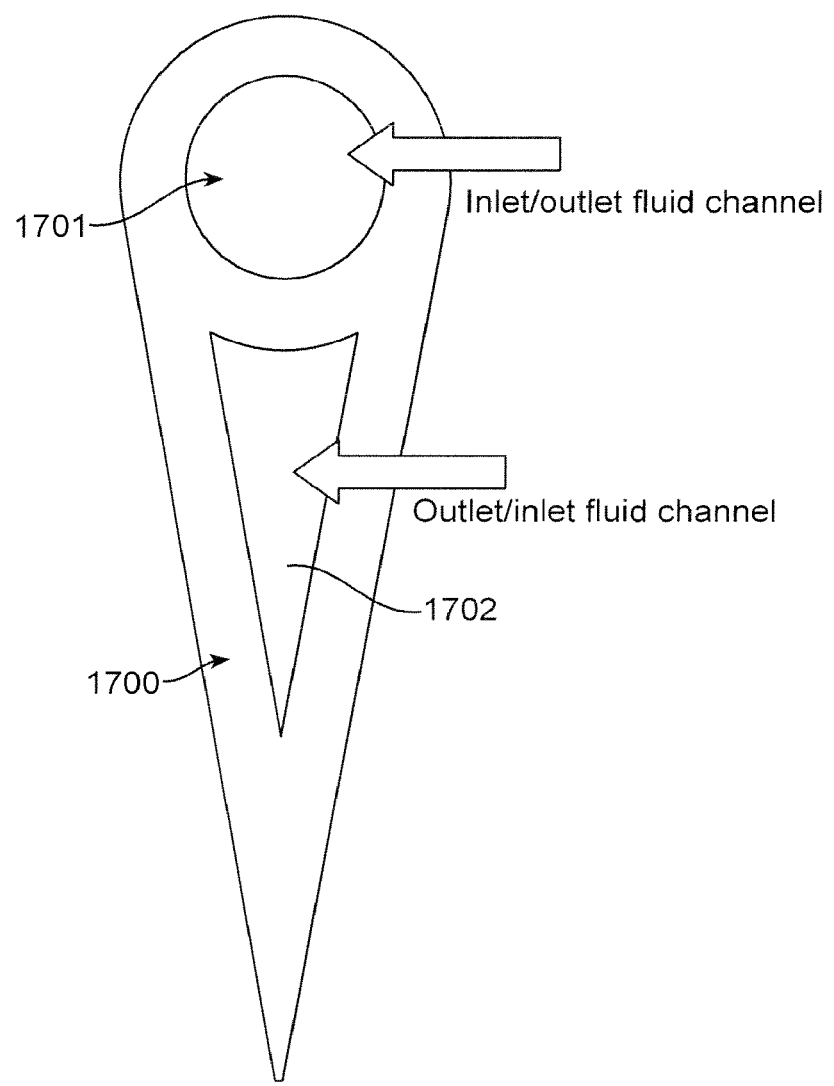
FIG. 17 illustrates a tapered absorber.

FIG. 17 illustrates a single channel u-tube absorber 1700 having a tapered form factor. The absorber 1700 has one sealed end (not shown) that connects the upper tube 1701 to the lower tube 1702. The opposite end of the absorber 1700 has inlet/outlet ports connected to each of the tubes 1701 and 1702.

Figure 18:
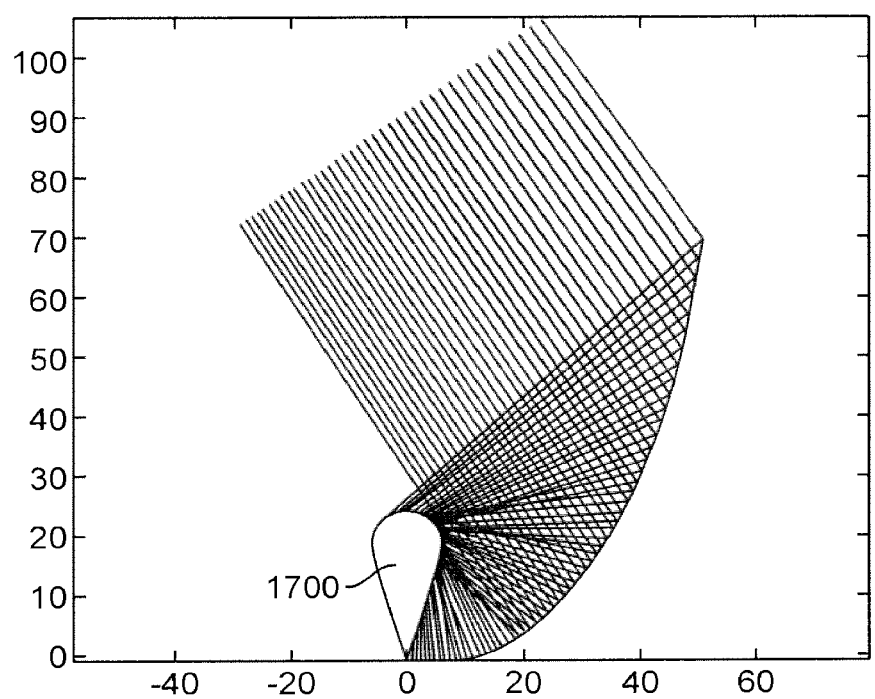
FIG. 18 illustrates the design of a thermodynamically efficiency concentrator for use with the tapered absorber of FIG. 17.
Figure 19A:
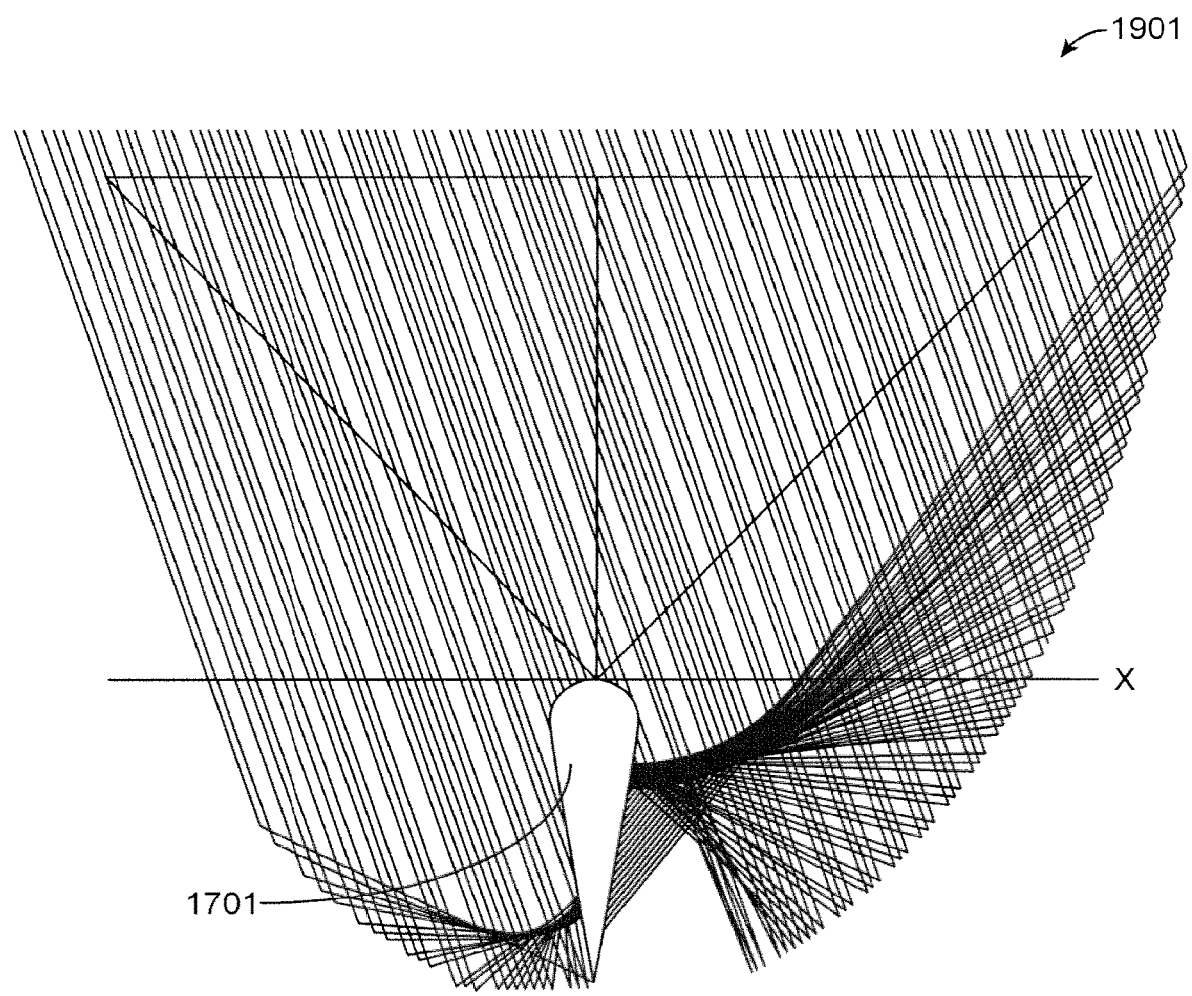
FIGS. 19A and 19B show ray traces for a concentrator tube for use with the tapered absorber of FIG. 17.
Figure 19B:
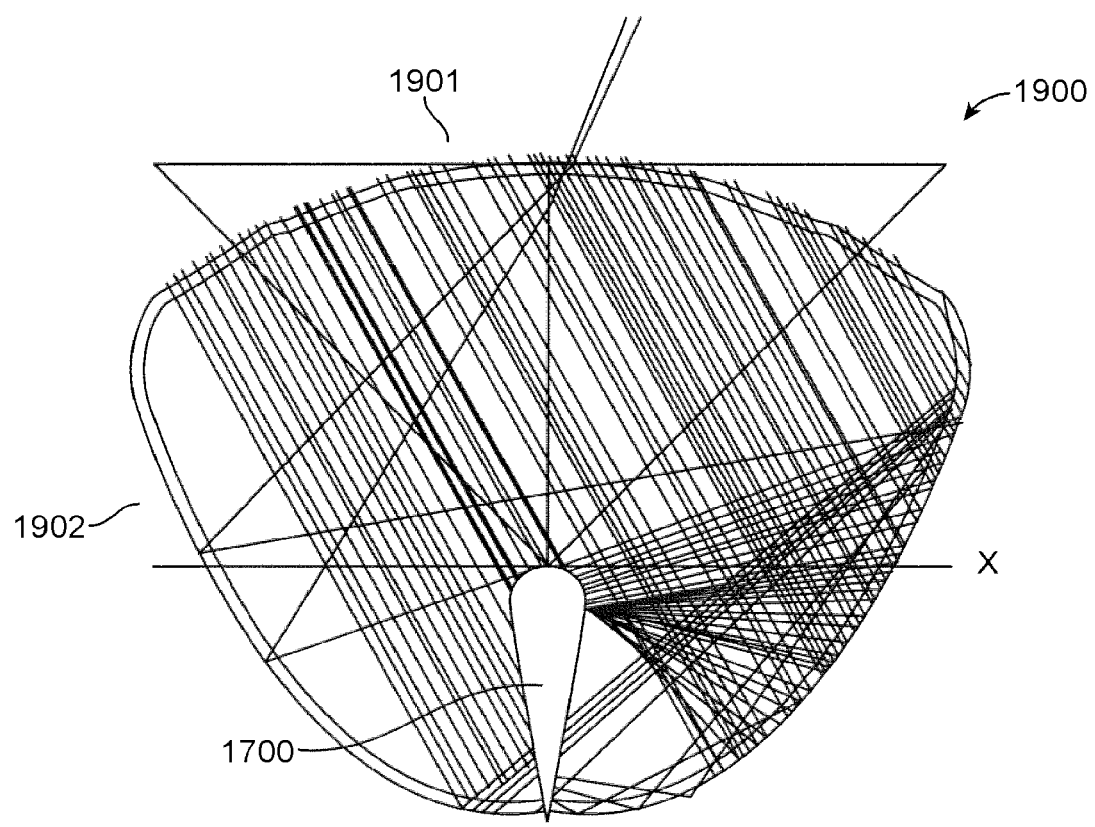

FIG. 18 illustrates the design of a thermodynamically efficiency concentrator for use with the tapered absorber of FIG. 17. FIGS. 19A and 19B show ray traces for a concentrator tube 1900 for use with the tapered absorber of FIG. 17. FIG. 19A shows a trace for only the reflective portion 1901 of the concentrator tube. FIG. 19B shows a trace for the full tube 1900 including both the reflective portion 1901 and the input aperture window 1902.

Figures 20A, 20B:
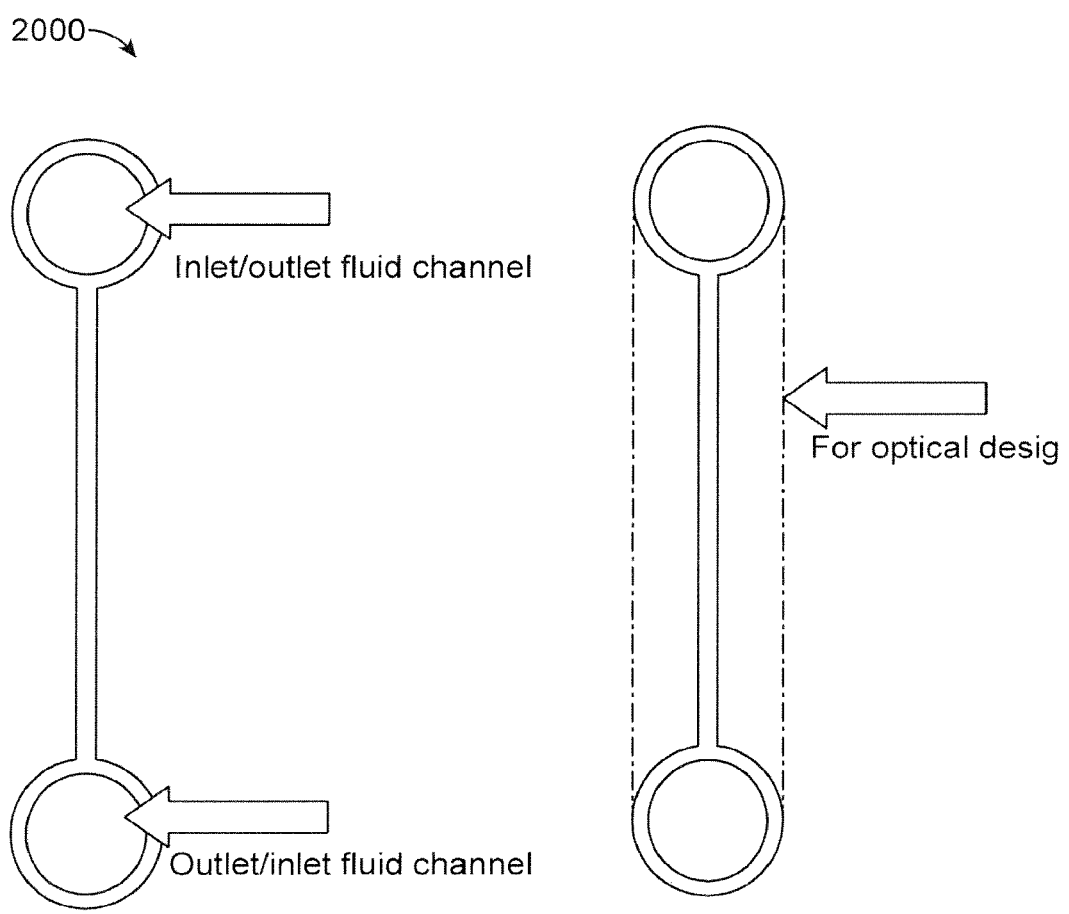
FIG. 20A illustrates a u-tube absorber with an absorber fin.
FIG. 20B illustrates an effective shape of the u-tube absorber with an absorber fin of FIG. 20A.

FIG. 20A illustrates a u-tube absorber 2000. The absorber 2000 includes two fluid channels 2001 and 2002 connected at one end by a u-shaped connector (not shown). The fluid channels 2001 and 2002 are coupled (e.g., both physically and thermally) to a fin member 2003 (e.g., extending between the channels) that increases the surface area of the absorber.

Figure 20C:
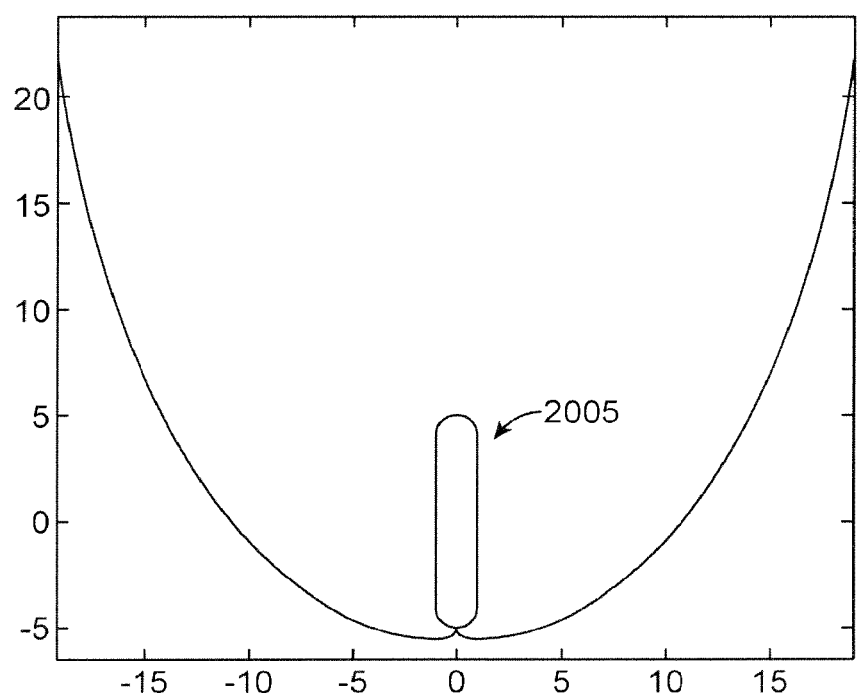
FIG. 20C shows a concentrator design for use with the u-tube absorber with an absorber fin of FIG. 20A.

FIG. 20B illustrates an effective shape 2005 (indicated with a dotted line) that may be used in designing a concentrator for use with the of the u-tube absorber 2000. FIG. 20C illustrates a concentrator design based on the effective shape 2005 produced using the techniques described herein.

Figure 21A:
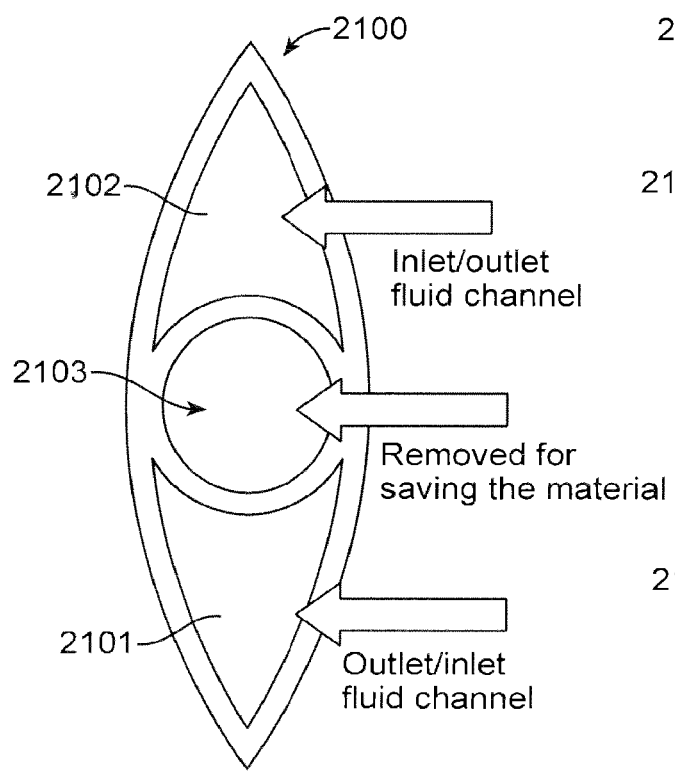
FIG. 21A illustrates an absorber having an inlet channel and an outlet channel.

FIG. 21A illustrates and absorber 2100 having an inlet channel 2101 and an outlet channel 2102. The absorber 1700 has one sealed end (not shown) that connects the channels. A central member 2103 defines the channels 2101 and 2102. In some embodiments this central member may be a hollow tubular member, e.g., to save on material costs.

Figure 21B:
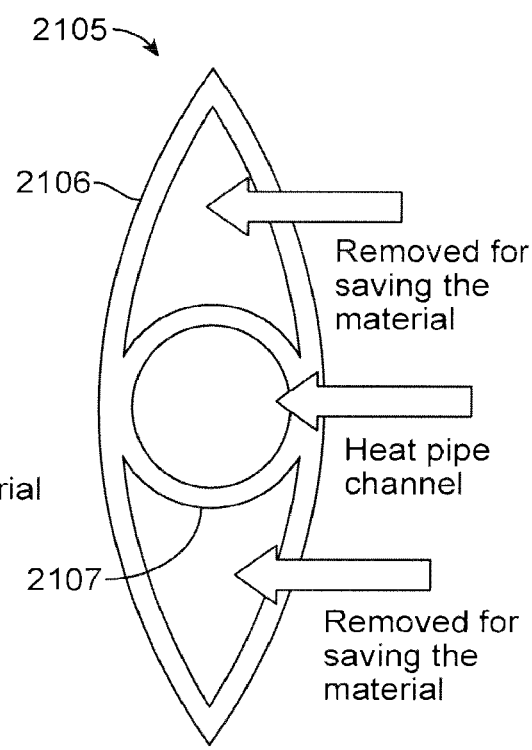
FIG. 21B illustrates an absorber featuring a heat pipe.

FIG. 21B illustrates and absorber 2105 having an outer member 2106 that surrounds and is thermally coupled to an inner channel member 2107. The inner channel member mat contain a heat pipe. In some embodiments, the outer member 2106 may be a hollow tubular member, e.g., to save on material costs.

Figure 21C:
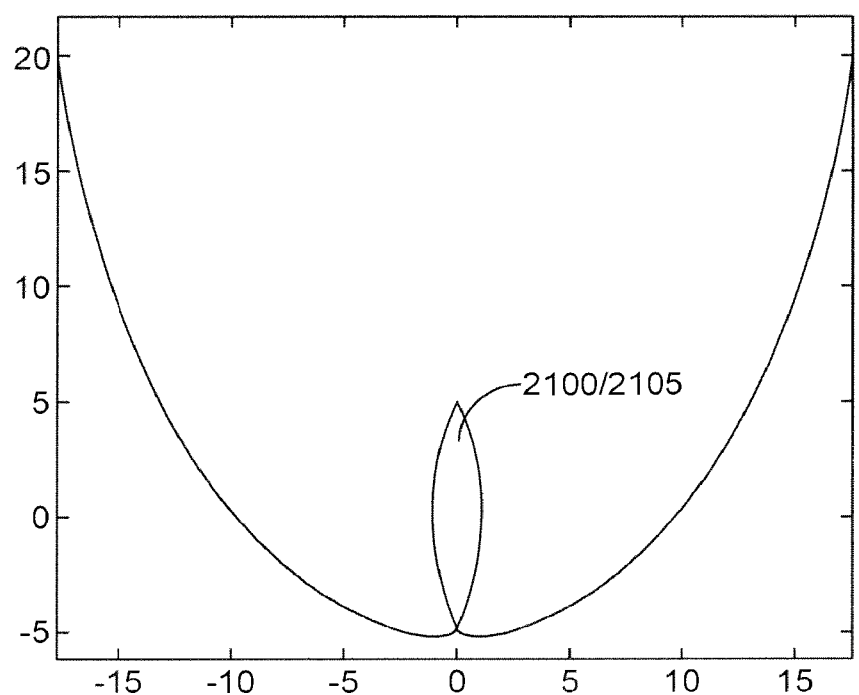
FIG. 21C illustrates shows a concentrator design for use with the absorbers of FIGS. 21B and 21C.

FIG. 21C illustrates a concentrator design for the absorber 2100 or 2105 using the techniques described herein.

Figure 22:
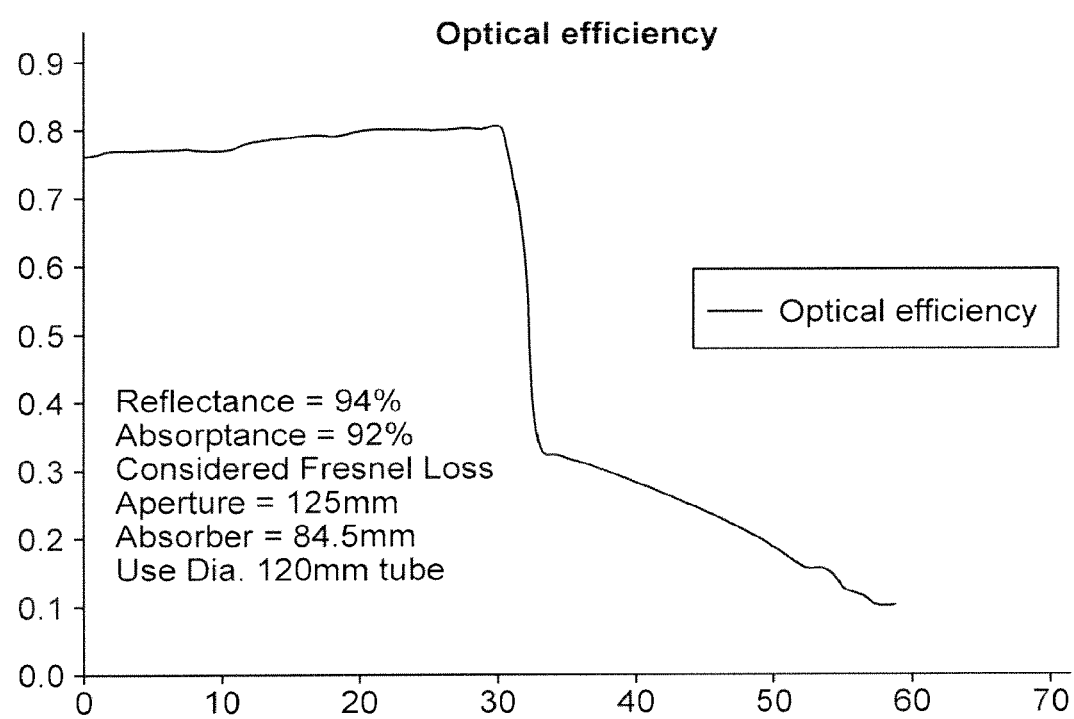
FIG. 22 is a plot of optical efficiency as a function of the angle on incident light for a concentrator tube.

FIG. 22 is a plot of calculated optical efficiency as a function of the angle on incident light for a concentrator tube of the type described herein. The concentrator tube features a reflector with 94% reflectance, an absorber with 92% absorbance, an aperture size of 125 mm, and absorber size of 84.5 mm, and a tube diameter of 120 mm. Note that the optical efficiency is essentially constant and greater than 80% for angles less than 30%.

Accordingly, the concentrator is well suited for non-tracking applications. In other embodiments, concentrators may feature even greater optical efficiency over even wider acceptance angles.

The foregoing description of embodiments has been presented for purposes of illustration and description. The foregoing description is not intended to be exhaustive or to limit embodiments of the present disclosure to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present disclosure in various embodiments and with various modifications as are suited to the particular use contemplated. The features of the embodiments described herein may be combined in all possible combinations of methods, apparatus, modules, systems, and computer program products.

One or more or any part thereof of the techniques described herein can be implemented in computer hardware or software, or a combination of both. The methods can be implemented in computer programs using standard programming techniques following the method and figures described herein. Program code is applied to input data to perform the functions described herein and generate output information. The output information is applied to one or more output devices such as a display monitor. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits preprogrammed for that purpose.

Each such computer program is preferably stored on a storage medium or device (e.g., ROM or magnetic diskette) readable by a general or special purpose programmable computer, for configuring and operating the computer when the storage media or device is read by the computer to perform the procedures described herein. The computer program can also reside in cache or main memory during program execution. The analysis method can also be implemented as a computer-readable storage medium, configured with a computer program, where the storage medium so configured causes a computer to operate in a specific and predefined manner to perform the functions described herein.

A number of embodiments of the invention have been described. Nevertheless, it will be understood that various modifications may be made without departing from the spirit and scope of the invention.

As used herein the term "light" and related terms (e.g. "optical") are to be understood to include electromagnetic radiation both within and outside of the visible spectrum, including, for example, ultraviolet and infrared radiation.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A concentrator tube extending from a distal end to a proximal end, the concentrator tube comprising:
   a trough shaped reflector portion extending between the proximal end and the distal end and defining an upper opening, the reflector portion configured to concentrate light from a source onto an absorber;
   a light transmissive aperture member closing the upper opening of the trough shaped reflector portion, the light transmissive aperture member formed integrally with the trough shaped reflector portion through an extrusion process such that a volume enclosed by the concentrator tube is formed as whole via the extrusion process, wherein the tube concentrates light incident through the aperture member at angles to an optic axis less than an acceptance angle with an optical efficiency greater than 80%; and
   the absorber located within the tube;
   wherein:
      the reflector portion is configured such that substantially any radiation energy emitted from the absorber onto the reflector portion is either directed to the source or directed back to the absorber; and
      each end of the concentrator tube is sealed such that the concentrator tube encloses the volume between the trough shaped reflector portion, the light transmissive aperture member, and the sealed ends of the concentrator tube, the volume being substantially evacuated, and
      the reflector portion and the aperture member are formed by rolling a mandrel on an outside surface of a softened glass tube.

2. The concentrator tube of claim 1, wherein the reflector portion is located on an interior wall of the volume.

3. The concentrator tube of claim 1, wherein the reflector portion is located outside of the volume.

4. The concentrator tube of claim 1, wherein the aperture member is less curved than the reflector portion.

5. The concentrator tube of claim 1, wherein the aperture member is substantially flat.

6. The concentrator tube of claim 1, wherein the absorber is positioned to accommodate refraction of light entering the concentrator tube through the aperture member.

7. The concentrator tube of claim 1, wherein the reflector portion is configured to accommodate refraction of light entering the concentrator tube through the aperture member.

8. The concentrator tube of claim 7, wherein the reflector portion is configured such that edge ray light rays refracted by the aperture member reflect from the reflector portion and contact the absorber.

9. The concentrator tube of claim 1, wherein the absorber is configured to have a thermal energy transfer fluid flowing therethrough.

10. The concentrator tube of claim 9, wherein the absorber comprises an input and an output for the thermal energy transfer fluid, and wherein both the input and the output extend through a first end of the concentrator tube.

11. The concentrator tube of claim 9, wherein the absorber has an end portion located proximal a second end of the concentrator tube, and wherein the end portion is free to move within the tube in response to thermal expansion or contraction.

12. The concentrator tube of claim 9, wherein the absorber comprises a plurality of minichannels configured to allow flow therethrough of the thermal energy transfer fluid.

13. The concentrator tube of claim 1, wherein the tube concentrates through the aperture member at angles to the optic axis less than the acceptance angle with the optical efficiency greater than 90%.

14. The concentrator tube of claim 1, wherein the tube concentrates through the aperture member at angles to the optic axis less than the acceptance angle with the optical efficiency greater than 95%.

15. The concentrator tube of claim 1, wherein the tube concentrates through the aperture member at angles to the optic axis less than the acceptance angle with the optical efficiency greater than 99%.

16. The concentrator tube of claim 1, wherein the acceptance angle is greater than 10 degrees.

17. The concentrator tube of claim 1, wherein the acceptance angle is greater than 20 degrees.

18. The concentrator tube of claim 1, wherein the acceptance angle is greater than 25 degrees.

19. The concentrator tube of claim 1, wherein the acceptance angle is greater than 35 degrees.

20. The concentrator tube of claim 1, wherein the absorber comprises a heat pipe.

21. The concentrator tube of claim 9, wherein the absorber comprises a u-shaped tube coupled to an absorber fin.

22. The concentrator tube of claim 1, wherein the aperture member has an optical power of substantially zero.

23. The concentrator tube of claim 1, wherein the aperture member does not change a direction of the light from the source.

24. The concentrator tube of claim 1, wherein the reflector portion is configured to compensate for aberrations in the light entering the concentrator tube due to refraction by the aperture member.

25. The concentrator tube of claim 1, wherein the absorber has a tapered form factor.

26. The concentrator tube of claim 1, wherein the reflector portion is configured such that a gap exists between the absorber and a bottom section of the reflector portion.

27. The concentrator tube of claim 1, wherein the reflector portion is configured such that substantially all radiation energy emitted from the absorber onto the reflector portion is directed to the source.

28. The concentrator tube of claim 1, wherein a cross section of the reflector portion has a compound parabolic shape.

29. A method of forming a concentrator tube extending from a distal end to a proximal end, comprising:
   forming a trough shaped reflector portion extending between the proximal end and the distal end and defining an upper opening, the reflector portion configured to concentrate light from a source onto an absorber;
   forming a light transmissive aperture member closing the upper opening of the trough shaped reflector portion; and
   positioning the absorber located within the tube;
   wherein:
      the reflector portion is configured such that substantially any radiation energy emitted from the absorber onto the reflector portion is either directed to the source or directed back to the absorber, and wherein the reflector portion is further configured to compensate for aberrations in the light entering the concentrator tube due to refraction by the aperture member; and
      the reflector portion and the aperture member are formed by rolling a mandrel on an outside surface of a softened glass tube.

30. The method of claim 29, further comprising:
   forming a seal at each end of the tube to form a substantial vacuum within the tube.

31. The method of claim 30, wherein the seal on at least one end is a metal-to-glass seal.

32. A concentrator tube extending from a distal end to a proximal end comprising:
   a trough shaped reflector portion extending between the proximal end and the distal end and defining an upper opening, the reflector portion configured to concentrate light from a source onto an absorber;
   a light transmissive aperture member closing the upper opening of the trough shaped reflector portion, wherein the tube concentrates light incident through the aperture member at angles to an optic axis less than an acceptance angle with an optical efficiency greater than 80%; and
   the absorber located within the tube;
   wherein:
      the reflector portion is configured such that substantially any radiation energy emitted from the absorber onto the reflector portion is either directed to the source or directed back to the absorber;
      each end of the tube is sealed; and
      the reflector portion and the aperture member are formed by rolling a mandrel on an outside surface of a softened glass tube.

* * * * *